(12) United States Patent
Krishnamurthi et al.

(10) Patent No.: US 6,198,929 B1
(45) Date of Patent: Mar. 6, 2001

(54) SYSTEM AND METHOD FOR MOBILE SWITCHING CENTER INITIATED SERVICE NEGOTIATION

(75) Inventors: Rajeev Krishnamurthi; Bibhu P. Mohanty; Roy F. Quick, Jr., all of San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 08/986,488

(22) Filed: Dec. 8, 1997

(51) Int. Cl.$^7$ .................................................. H04Q 7/38
(52) U.S. Cl. ........................ 455/439; 455/466; 455/442
(58) Field of Search .................................... 455/466, 436, 455/438, 439, 442, 416, 525

(56) References Cited

U.S. PATENT DOCUMENTS

| | | | |
|---|---|---|---|
| 5,721,762 | * | 2/1998 | Sood .................................. 455/466 X |
| 5,787,357 | * | 7/1998 | Salin ..................................... 455/466 |
| 5,889,844 | * | 3/1999 | Kim et al. ......................... 455/416 X |

OTHER PUBLICATIONS

"Mobile Station–Base Station Compatibility Standard for Dual–Mode Wideband Spread Spectrum Cellular System" TIA/EIA/IS–95–A + TSB74; Feb. 27, 1996; pp. 6–163 through–178.

* cited by examiner

Primary Examiner—Fan Tsang
Assistant Examiner—Philip J. Sobutka
(74) Attorney, Agent, or Firm—Philip Wadsworth; Thomas R. Rouse; S. Hossain Beladi

(57) ABSTRACT

A system and method for providing mobile switching center (MSC) initiated service negotiation in a wireless communication system. If a new call arrives for a subscriber unit while the subscriber unit is already on the traffic channel, a change in the service configuration may allow the subscriber unit to receive the new call while preserving the old call. MSC initiated service negotiation may be used to establish the change in service configuration. The MSC transmits a Change Service Command message to the base station in whose coverage area the subscriber unit is located. The Change Service Command proposes a new service configuration to accommodate both the old and the new call. The base station, subscriber unit, and MSC may interchange further messages to modify the proposed service configuration if necessary. Messages are exchanged until the base station, subscriber unit, and MSC reach an agreement regarding the new service configuration. The present invention also provides support for soft handoff. The new service configuration is presented to all target base stations involved in the soft handoff, so that the subscriber unit may make use of the new service configuration while in soft handoff.

23 Claims, 4 Drawing Sheets

SYSTEM AND METHOD FOR MOBILE SWITCHING CENTER INITIATED SERVICE NEGOTIATION

BACKGROUND OF THE INVENTION

I. Field of the Invention

The present invention relates to communications. More particularly, the present invention relates to a system and method for performing mobile switching center initiated service negotiation.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and amplitude modulation (AM) schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein.

In the wireless CDMA system, a large number of wireless subscriber units, each having a transceiver, communicates through satellite repeaters or terrestrial stations which are also referred to as cells. Each cell includes a physical plant called a base station. A cell covers a limited geographic area and routes calls carried over subscriber units to and from a telecommunication network via a mobile switching center. When a subscriber moves into the geographic area of a new cell, the routing of that subscriber's call may be eventually made through the new cell by a process called a "handoff."

A subscriber unit transmits a signal that is received by a base station. The signal is then relayed to a mobile switching center which in turn routes the signal to the public switched telephone network and to telephone lines or other subscriber units. Similarly, a signal may be transmitted from the public switched telephone network to a subscriber unit via a base station and a mobile switching center. The communications channel allocated for communication of information between the subscriber unit and the base station is called the traffic channel.

The interface between the subscriber unit and the base station is referred to as the air interface. The telecommunications industry association (TIA) has provided a standard for CDMA call processing on the air interface entitled "IS-95 Mobile Station—Base Station Compatibility Standard for Dual Mode Wideband Spread Spectrum Cellular System." Addendum to IS-95 are provided as Telecommunications Service Bulletins (TSB). The standard IS-95+ TSB74 includes provisions for service negotiation on the air interface and is incorporated herein by reference. The interface between the base station and the mobile switching center is referred to as the A interface. The TIA has provided for call processing on the A interface through the standard provided in "IS-634 Mobile Switching Center—Base Station Interface for Public 800 MHz," which is also incorporated herein by reference. IS-95-A and IS-634 both define the messages and signals that are sent on their respective interfaces for the operation of a CDMA wireless system.

The call flow in a CDMA system requires processing on both the air interface and the A interface. The successful progression of a call requires that the proper messages and signals are sent at the right times on both the air interface and the A interface. The IS-634 standard is being developed to provide for call processing on the A interface. A number of problems and deficiencies are present in IS-634 which currently does not support some of the necessary operations on the A interface.

One deficiency in IS-634 is in the handling of the delivery of Short Message Service (SMS) messages by the mobile switching center. The Short Message Service provides for the transfer of SMS messages between a subscriber station and a Message Center. The mobile switching center and the base station provide a conduit for the messages between the message center and the subscriber station. Generally, SMS messages are messages associated with services subscribed to by a user. For example, a user may subscribe to a "stock quotes" service. The user will then periodically receive the quotes in the form of SMS message. SMS messages may be displayed as text messages on the subscriber unit. The SMS messages are sent from the mobile switching center to a base station, which in turn transmits the SMS messages to a subscriber unit. The base station may transmit the SMS messages to the subscriber unit on the paging channel or the traffic channel.

A problem arises when a new call comes in for the subscriber unit while the subscriber unit is receiving SMS messages on the traffic channel. Since the traffic channel is already occupied for delivery of SMS messages, the only options available to the mobile switching center are to either provide a busy signal to the calling party, or drop the SMS call and reestablish the traffic channel to deliver the new call. Neither option is very desirable. This deficiency is recognized and solved by the present invention in the manner described below.

SUMMARY OF THE INVENTION

The present invention is a system and method for providing improved messaging on the interface between a mobile switching center and a base station, also known as the A interface, of a wireless communication system. The present invention recognizes that the A interface, as previously defined by the IS-634 standard, does not properly handle the delivery of Short Message Service (SMS) messages by the mobile switching center under certain circumstances. In situations where a new call arrives for a subscriber unit while an SMS message is being transmitted to the subscriber unit on the traffic channel, the mobile switching center has two options under current procedures. The mobile switching center may either provide a busy signal to the calling party or drop the SMS message delivery and reestablish the traffic channel to deliver the new call. The present invention recognizes that improvements are needed for the A interface to reliably handle the delivery of SMS messages when a new call arrives. For example, a voice call may arrive for the subscriber unit while it is receiving SMS messages. Mobile switching center initiated service negotiation is introduced on the A interface to provide the improvements.

In a wireless communication system, service negotiation is the process by which a subscriber unit negotiates with the network to establish the air interface configuration for different wireless services. This configuration includes the forward and reverse communication rates, the forward and reverse framing formats (multiplex option), and services associated with different logical connections (service options). Service options refer to the service capabilities of the system, and may be applications such as voice, data, facsimile, or SMS. Presently, service negotiation is defined on the air interface to permit service negotiation between the subscriber unit and the base station. The present invention introduces service negotiation on the A interface to allow for mobile switching center initiated service negotiation, whereby the mobile switching center instructs the base station to initiate service negotiation with the subscriber unit over the air interface.

In accordance with the present invention, while a subscriber unit is receiving an SMS message on the traffic channel, if a new call arrives for the subscriber unit, the mobile switching center initiates service negotiation to allow delivery of the new call to the mobile station without dropping the delivery of the SMS message. The service negotiation will establish a new service configuration for the subscriber unit. For example, a voice call may arrive while an SMS call is in progress. In one embodiment, the new service configuration sets the primary service option to be voice, and the secondary service option to be SMS. Thus, voice from the new call and SMS messages are multiplexed, and both are delivered to the subscriber unit on the traffic channel. In another embodiment, the new service configuration sets the primary service option to be voice, and provides for SMS messages to be delivered as paging messages.

The present invention is also applicable to situations wherein a subscriber unit is receiving a call other than an SMS call on the traffic channel when a new call arrives for the same subscriber unit. For example, the subscriber unit may be involved in a packet call with a packet data network when a new call arrives. In this situation, the new service configuration will set the primary service option to be voice, and the secondary service option to be packet data services.

To establish the new service configuration for a subscriber unit, a message generator in the mobile switching center generates a Change Service Command message, which is delivered to the base station in whose coverage area the subscriber unit is located. In a preferred embodiment, the Change Service Command message includes a Service Configuration Record element, which proposes the primary service option to be the service option of the new call. The existing call may be accommodated using a secondary service option or signaling messages. For example, the Service Configuration Record element may provide for the existing SMS call to be delivered as a secondary service option or as signaling messages. After initiation of the service negotiation, further messages are exchanged between the mobile switching center, base station, and subscriber unit until the new service configuration is agreed upon. Message generators in the mobile switching center, base station, and subscriber unit compose the transmitted messages, while message processors analyze the received messages in order to direct the message generators to compose the appropriate response messages.

A subscriber unit may be moving from the coverage area of a source base station to the coverage area of a target base station or base stations while service negotiation is in progress. In this situation, a handoff is necessary. During a soft handoff, the present invention provides for all target base stations to be informed of the new service configuration, so that the subscriber unit may receive both the new call and the SMS messages (or messages associated with some other existing call) after the handoff. The new service configuration is delivered to the target base stations by transmitting a Change Service Configuration Directive message from the source base station to the target base stations. Each target base station responds with an acknowledgment. Thereafter, the subscriber unit may receive the new call via the target base stations while continuing to receive SMS messages.

The present invention supports soft handoff in systems using circuit mode transport as well as systems using packet mode transport. If soft handoff is being performed in a system using circuit mode transport for inter base station communication, the new service configuration information will be transmitted from the source base station to the target base stations via the mobile switching center. Using circuit mode transport, there is no direct signaling channel between the base stations. In a system using packet mode transport, the new service configuration information will be transmitted directly from the source base station to the target base stations.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention provides a system and method for allowing a mobile switching center (MSC) to initiate service negotiation to deliver a new call to a subscriber unit while the subscriber unit is receiving an existing call on the traffic channel.

Figure 1:
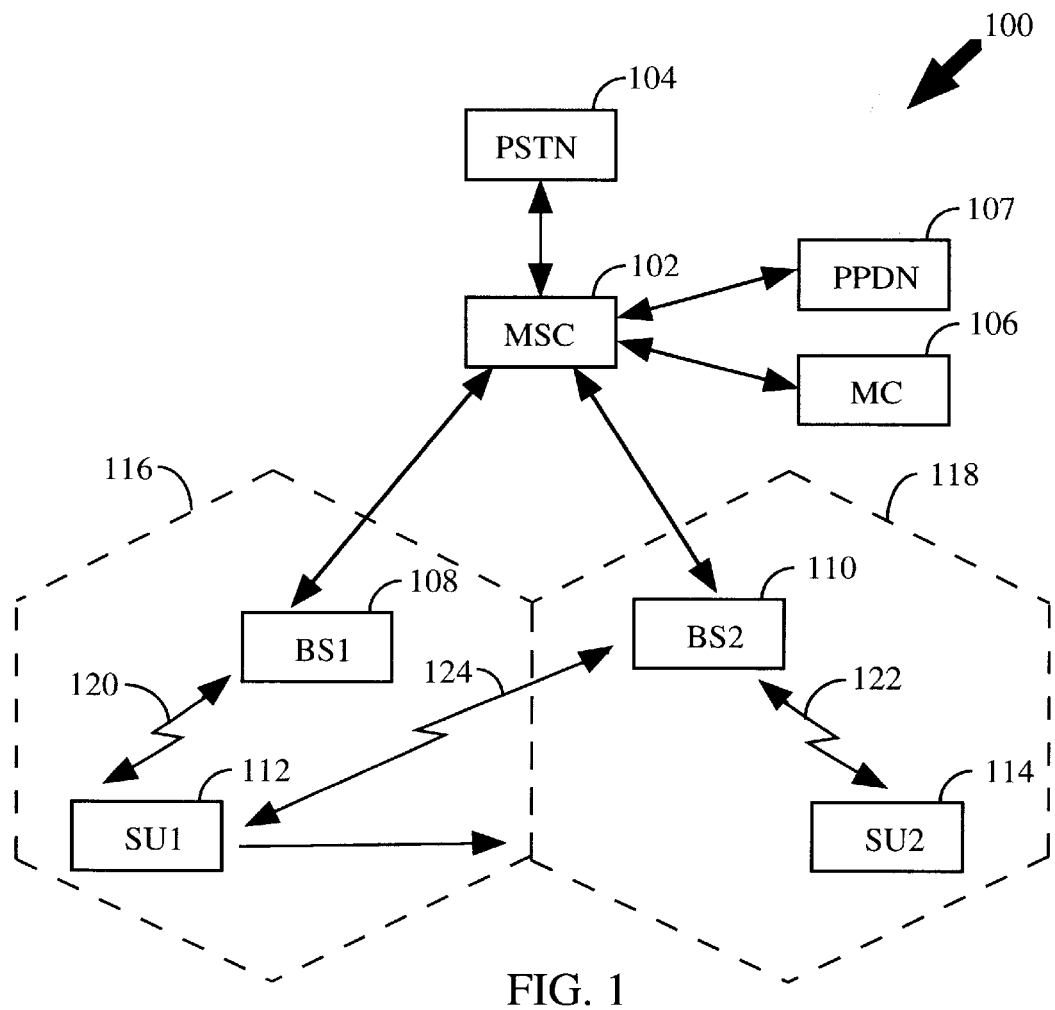
FIG. 1 is a block diagram of an exemplary wireless communication system.

An exemplary wireless communication system in which the present invention is embodied is illustrated in FIG. 1. In a preferred embodiment, the communication system is a CDMA wireless communications system, although it should be understood that the present invention is equally applicable to other types of communication systems. Systems utilizing other well known transmission modulation schemes such as TDMA and FDMA as well as other spread spectrum systems may employ the present invention.

The wireless system is indicated generally by 100 and includes a mobile switching center (MSC) 102, also referred to as a mobile telephone switching office (MTSO), that includes interface and processing circuitry for providing system control to the base stations. MSC 102 routes telephone calls from public switched telephone network (PSTN) 104 to the appropriate base station for transmission to the appropriate subscriber unit. MSC 102 also controls the routing of calls from the subscriber units via one or more base stations to PSTN 104. In addition, MSC 102 may direct calls between subscriber units via the appropriate base stations. MSC 102 may be coupled to the base stations by various conventional means, such as dedicated telephone lines, optical fiber links, or by radio frequency communications. MSC 102 is also coupled to message center (MC) 106, which stores and generates messages associated with the Short Message Service. MSC 102 may also be interfaced with other entities such as a public/private packet data network (PPDN) 107.

In FIG. 1, two exemplary base stations, BS1 108 and BS2 110, along with two exemplary subscriber units, SU1 112 and SU2 114 are illustrated. BS1 108 serves cell 1 116 of the cellular network by relaying messages between subscriber units located within cell 1 116 and MSC 102. Likewise, BS2 110 serves cell 2 118 of the cellular network by relaying messages between subscriber units located within cell 2 118 and MSC 102. As shown in FIG. 1, SU1 112 is located within cell 1 116, and SU2 114 is located within cell 2 118. SU1 112 and SU2 114 may be mobile stations (MSs) such as mobile telephones or Personal Communication System (PCS) stations, or some other wireless subscriber equipment such as the Fixed Wireless Terminal (FWT).

BS1 108 communicates with SU1 112 via link 120, which is a two-way link characterized by forward and reverse code channels. A forward link is the link from a base station to a subscriber unit, while a reverse link is the link from a subscriber unit to a base station. BS2 110 communicates with SU2 114 via two-way link 122.

If SU1 112 moves from cell 1 116 to cell 2 118, a handoff occurs. In a soft handoff, SU1 112 establishes communications link 124 with the target base station, BS2 110, in addition to existing link 120 with the source base station, BS1 108. Once SU1 112 has crossed into cell 2 118, it may drop link 120.

As previously mentioned, the interface between BSs 108 and 110 and SUs 112 and 114 is called the air interface, and for the purposes of the present invention, call processing on the air interface is governed by IS-95+TSB74. Also as previously mentioned, the interface between MSC 102 and BSs 108 and 110 is called the A interface, and call processing on the A interface is governed by IS-634. The present invention recognizes that the A interface as previously defined by IS-634 lacks support for properly handling a new call when an SMS call is in progress. In addition, the present invention recognizes that introduction of MSC initiated service negotiation will permit a new call to be established while an existing call is being transmitted on the traffic channel.

The existing call may be a Short Message Service call, a packet data call, or some other type of call. Recall that a Short Message Service provides for the transfer of SMS messages between a subscriber station and a Message Center. In FIG. 1, SMS messages may be sent between MC 106 and either SU1 112 or SU2 114. Packet data service provides for the transfer of packet data between a PPDN and a subscriber unit. A PPDN may comprise the integrated services digital network (ISDN). In FIG. 1, packet data may be sent between PPDN 107 and either SU1 112 or SU2 114. The following discussion focuses on the scenario wherein the existing call is an SMS call. However, a person skilled in the art will recognize that the present invention is equally applicable when the existing call is a packet data call or even some other type of call.

SMS messages are messages associated with Short Message Services subscribed to by a user. These messages may be delivered on either the paging channel or the traffic channel. Generally, a paging channel is used for the transmission of control information and pages from a base station to a subscriber unit. As previously discussed, a traffic channel is generally used for communicating user and signaling traffic.

A problem arises when a new call arrives for a subscriber unit while the subscriber unit is receiving SMS messages which are being transmitted on the traffic channel. Still referring to FIG. 1, a description is provided herein of previous techniques for handling this situation. Assume that SU1 112, located in cell 1 116, is currently receiving SMS messages on the traffic channel. The SMS messages originate from MC 106 and are transmitted to SU1 112 via MSC 102 and BS1 108. Suppose a new call originating from PSTN 104 arrives for SU1 112 while SU1 112 is still receiving SMS messages on the traffic channel. Without the mobile switching center initiated service negotiation capability, MSC 102 handles the new call in one of two ways.

In certain systems, MSC 102 provides a busy signal to the calling party in PSTN 104, preventing the new call from being delivered to SU1 112. In other systems, while SMS messages are still being delivered, MSC 102 will cause the SMS call to be dropped and will direct the traffic channel to be reestablished for delivery of the new call. MSC 102 will release the traffic channel by sending a Clear Message to BS1 108 instructing it to clear the SMS call. BS1 108 sends a Release Order to SU1 112, which responds by sending a Release Order back to BS1 108. SU1 112 goes into an idle state. MSC 102 then reestablishes a new traffic channel to deliver the new call through paging messages and page response messages. Neither system provides an ideal solution because either the SMS call is dropped or the new call is blocked.

In order to preserve the SMS call while establishing the new call, the present invention introduces MSC initiated service negotiation. Service negotiation is the process by which the service configuration to be used by the subscriber unit on the air interface is established. A service configuration consists of forward and reverse traffic channel multiplex options, forward and reverse traffic channel transmission rates, and service option connections. Service options are the service capabilities of the system such as the voice service option and the SMS service option. Improvements for service negotiation as initiated by a subscriber unit or a base station are discussed in copending patent application Ser. No. 08/986,489, now U.S. Pat. No. 6,134,434, entitled "SYSTEM AND METHOD FOR PROVIDING SERVICE NEGOTIATION IN A COMMUNICATIONS NETWORK," assigned to the assignee of the present invention and incorporated by reference herein. The present invention is directed to service negotiation initiated by a mobile switching center.

Figure 2:
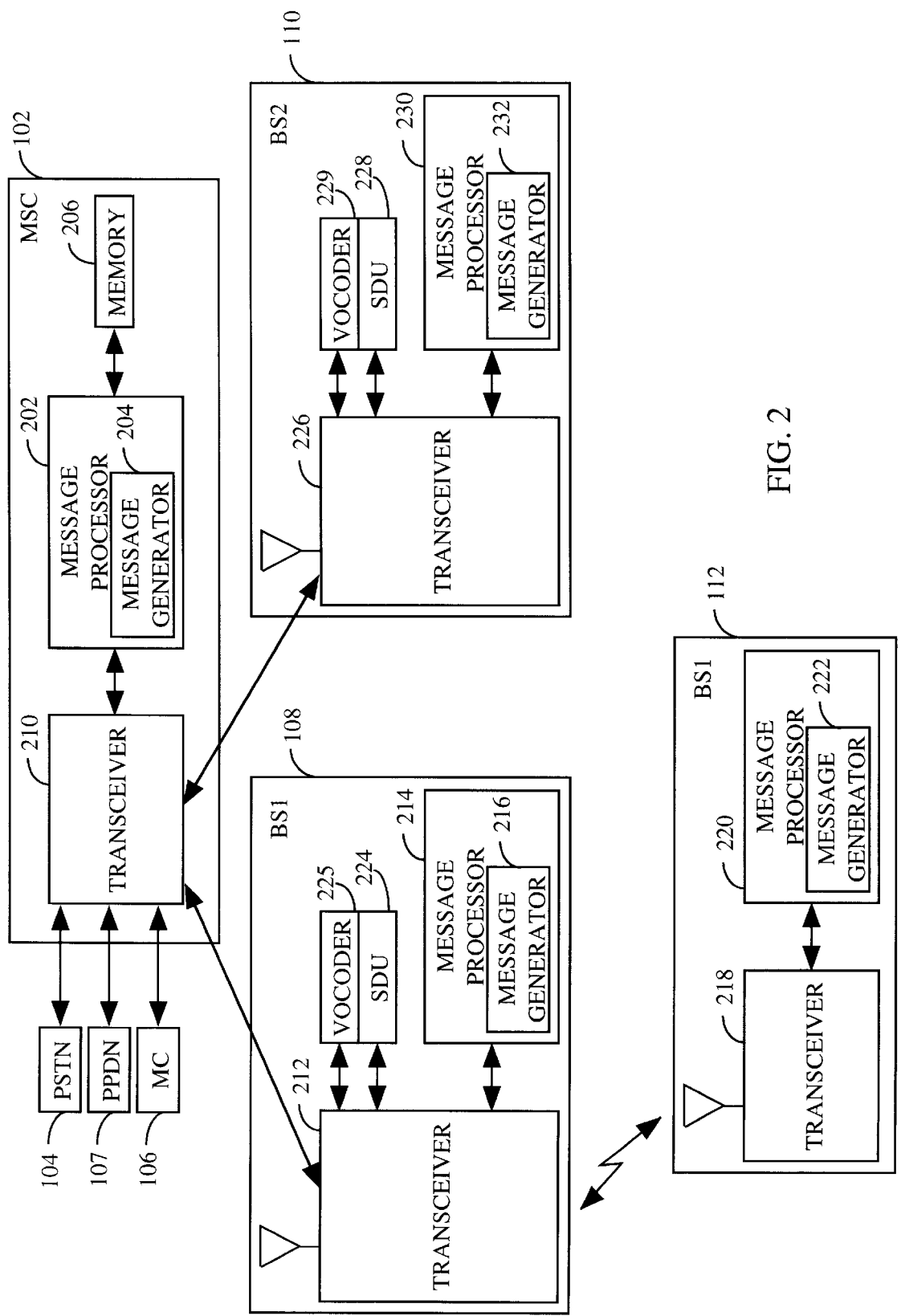
FIG. 2 is a block diagram illustrating a system for implementing mobile switching center initiated service negotiation in accordance with the present invention.

FIG. 2 is a diagram of system 100 of FIG. 1, illustrating the processing elements of MSC 102, BS1 108, BS2 110, and SU1 112 used for MSC initiated service negotiation. MSC 102 is comprised of a message processor 202 which processes the messages associated with service negotiation. Message generator 204 of message processor 202 generates the messages associated with service negotiation. Transceiver 210 transmits and receives messages associated with the service negotiation. In addition, MSC 102 comprises memory 206, which stores the Subscribed Services Records for the subscriber units serviced by system 100. A Subscribed Services Record contains a list of service options that a particular subscriber unit is authorized to use.

In accordance with the present invention, MSC initiated service negotiation is triggered by a new call arriving for a subscriber unit while an SMS call utilizing the traffic channel is in progress. For the purposes of the present discussion, the new call will be assumed to be a voice call, although it should be understood that a call of a different service option, such as a fax call or a data call, may also constitute the new call.

Upon initiation of service negotiation by MSC 102, message generator 204 of message processor 202 generates a Change Service Command message for transmission to the appropriate base station via transceiver 210. The Change Service Command message will propose a new service configuration for the subscriber unit. In one embodiment, the new service configuration proposes the primary service option to be voice, the secondary service option to be SMS, and other options as permitted by the Subscribed Services Record of the subscriber station. Alternatively, the new service configuration may provide for SMS to be delivered as signaling messages. Referring to FIG. 2, if a voice call from PSTN 104 arrives for SU1 112 which is located within the service area of BS1 108, transceiver 210 of MSC 102 will transmit the Change Service Command to transceiver 212 of BS1 108.

In BS1 108, the Change Service Command will be relayed to message rocessor 214, which analyzes the received message and instructs message enerator 216 to generate a response message. Generally, message generator 16 will compose a Service Request Message, which will be transmitted by ransceiver 212 to SU1 112.

At SU1 112, transceiver 218 receives the Service Request Message and presents the message to message processor 220. Message processor 220 analyzes the message, and causes message generator 222 to generate a response message. For example, in response to the Service Request Message, a Service Response Message may be generated by message generator 222. The Service Response Message is then transmitted to BS1 108 for analysis by message processor 214.

Further messages are then exchanged between BS1 108 and MSC 102; and BS1 108 and SU1 112. Message processors 202, 214, and 220 of MSC 102, BS1 108, and SU1 112, respectively analyze the received messages, and message generators 204, 216, and 222 of MSC 102, BS1 108, and SU1 112, respectively construct appropriate response messages. The message exchanges continue until a new service configuration for SU1 112 is agreed upon. This is generally signaled by an Assignment Complete message transmitted from BS1 108 to MSC 102.

The new service configuration for SU1 112 will include a setting for the primary service option to be voice. The setting will also provide that SMS may be delivered as a secondary service option or as a signaling message. Using this service configuration, a technique is provided for preserving the existing SMS call while allowing SU1 112 to receive the new call from PSTN 104. By making use of both a primary service option and a secondary service option or signaling messages, the new service configuration will allow both voice traffic and SMS messages to be transmitted.

If a secondary service option is used for the SMS call, the multiplex option of the service configuration will define the number of bits of each data frame to be allocated for the primary service option and the secondary service option. Referring still to FIG. 2, the elements which perform the multiplex function are explained. Selector 224 of BS1 108, generally a Selection Distribution Unit (SDU), will provide selection as well as multiplexing and demultiplexing of traffic frames. In the forward direction, speech from PSTN 104 will be transmitted to BS1 108 via MSC 102. SMS messages from MC 106 are also transmitted to BS1 108 via MSC 102. In a preferred embodiment, BS1 108 comprises vocoder 225 which encodes the received speech. An exemplary embodiment of a vocoder is described in U.S. Pat. No. 5,414,796, entitled "VARIABLE RATE VOCODER," assigned to the assignee of the present invention and incorporated by reference herein. The vocoded voice and SMS messages are multiplexed together for transmission to SU1 112 on the traffic channel. In the reverse direction, selector 224 will demultiplex the frames received from SU1 112 into a voice stream for transmission to PSTN 104 via BS1 108 and MSC 102, and an SMS message stream for transmission to MC 106 via BS1 108 MSC 102. At BS1 108, vocoder 225 may devocode the speech signal prior to transmission to PSTN 104 Thus, both SMS messages and voice messages may be transmitted on the same traffic channel.

Although illustrated in FIG. 2 as being part of BS1 108, it should be understood that vocoder 225 may instead be an element of MSC 102. The voice coding and decoding functions will in this embodiment be performed within BS1 108.

During an MSC initiated service negotiation, a handoff is necessary if SU1 112 moves from the coverage area of the source base station, BS1 108, to the coverage area of a target base station or base stations. Still referring to FIG. 2, the processing elements involved in a soft handoff situation are illustrated. A single target base station, BS2 110, is shown, although it should be understood that there may be multiple base stations. BS2 110 comprises transceiver 226, selector 228, vocoder 229, message processor 230, and message generator 232, which serve similar functions as transceiver 212, selector 224, vocoder 225, message processor 214, and message generator 216, respectively, of BS1 108.

If a call is in a soft handoff, in order for the negotiated service configuration to take effect, BS2 110 needs to be informed of the negotiated service configuration. In a soft handoff using circuit mode transport for inter base station communication, this is accomplished by having MSC 102 transmit a Change Service Configuration Directive message to BS2 110, informing BS2 110 of the new service configuration. The Change Service Configuration Directive is received by transceiver 226 and relayed to message processor 230 for analysis. In response, message generator 232 of BS2 110 generates a Change Service Configuration Directive Ack, which is transmitted by transceiver 226 to MSC 102. MSC 102 in turn transmits a Change Service Configuration Directive Ack to BS1 108. Since the source base station (BS1 108) and the target base station (BS2 110) are both aware of the new service configuration for SU1 112, the call can proceed without interruption of the SMS and voice calls.

Figure 3:
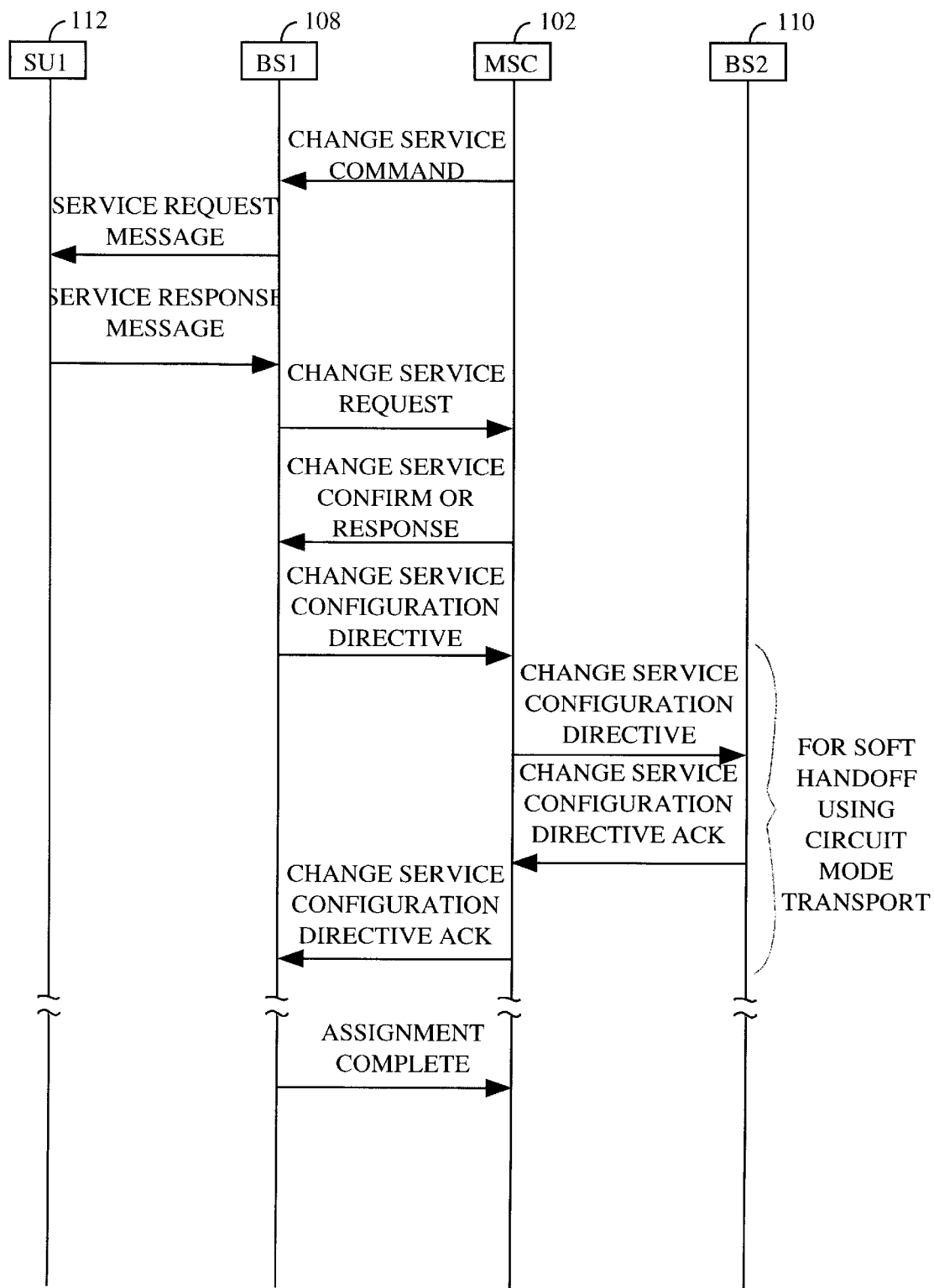
FIG. 3 is a flow diagram illustrating a mobile switching center initiated service negotiation procedure with or without base station soft handoff using circuit mode transport.

Referring now to FIG. 3, a flow diagram is shown illustrating the messages transmitted between the processing elements of FIG. 2 during an MSC initiated service negotiation. FIG. 3 also illustrates the messages transmitted when an MSC initiated service negotiation occurs while SU1 112 is in soft handoff using circuit mode transport.

A Change Service Command message is transmitted by MSC 102 to BS1 108, directing BS1 108 to initiate service negotiation with SU1 112. In a preferred embodiment, the Change Service Command message includes a Service Configuration Record, which is an element containing the service configuration proposed for SU1 112. In order to accommodate both the existing SMS call and the new voice call, the Service Configuration Record may propose the primary service option to be voice, and provide for SMS messages to be delivered as a secondary service option or as signaling messages. In another embodiment, a Subscribed Services Record is included in the Change Service Command message instead of the Service Configuration Record. The Subscribed Services Record includes a list of services that a subscriber unit is authorized to use, and will be used by BS1 108 and SU1 112 to negotiate the service configuration for SU1 112.

In response to the Change Service Command message, BS1 108 sends a Service Request Message to SU1 112. The Service Request Message contains the Service Configuration Record if one had been sent by MSC 102. Otherwise, the Service Request Message will contain a service configuration proposed by BS1 108 based on information from the Subscribed Services Record transmitted by MSC 102.

SU1 112 may either accept the service configuration contained in the Service Request Message, or propose another service configuration in a Service Response Message. BS1 108 and SU1 112 may exchange Service Request Messages and Service Response Messages until an agreement is reached regarding the service configuration for SU1 112.

Upon receiving a Service Response Message containing the service configuration agreed upon between BS1 108 and SU1 112, BS1 108 constructs a Change Service Request message containing the negotiated service configuration. BS1 108 sets the QUERY flag to '0' in the Service Negotiation Query element of the Change Service Request message to indicate that no additional information is requested by BS1 108 from MSC 102, i.e., that BS1 108 is capable of supporting the negotiated service configuration. The Change Service Request message is transmitted to MSC 102, informing MSC 102 of the negotiated service configuration.

In response to the Change Service Request Message, MSC 102 may send a Change Service Confirm message to BS1 108, authorizing the Change Service Request. If SU1 112 is not involved in soft handoff, the negotiated service configuration may begin to be utilized. Accordingly, SU1 112 may accept the new voice call while still receiving SMS messages. Alternatively, MSC 102 may send a Change Service Response message, causing the exchange of Service Request Message, Service Response Message, and Change Service Request message to be repeated until MSC 102, BS1 108, and SU1 112 reach an agreement. A series of messages are then exchanged for the new service configuration to become active, followed by an Assignment Complete message from BS1 108 to MSC 102 to inform MSC 102 that the new service configuration is now available. The new service configuration may then be utilized for the SMS call and the new voice call.

If SU1 112 is involved in soft handoff, then additional messages need to be exchanged to inform the target base station or base stations of the negotiated service configuration. Referring to FIGS. 2 and 3, a soft handoff may take place when SU1 112 moves from the coverage area of BS1 108 to the coverage area of BS2 110. In FIGS. 2 and 3, the source base station is BS1 108, and the target base station is BS2 110. It should be understood that there may be more than one target base station, in which case all target base stations will receive the same messages. FIG. 3 illustrates the messages that are transmitted during a soft handoff in a system using circuit mode transport for inter-BS communication. In circuit mode transport, BS1 108 and BS2 110 communicate with one another via MSC 102.

Thus, if SU1 112 is in soft handoff, the source base station, BS1 108, sends a Change Service Configuration Directive to MSC 102. The Change Service Configuration Directive contains the MSC approved service configuration. MSC 102 in turn sends a Change Service Configuration Directive to the target base station, BS2 110. BS2 110 returns a Change Service Configuration Directive Ack to indicate the outcome of processing the Change Service Configuration Directive. MSC 102 in turn returns to BS1 108 a Change Service Configuration Directive Ack. If more than one target base station are involved, then MSC 102 will transmit the Change Service Configuration Directive Ack to BS1 108 after receiving a positive acknowledgment from all target base stations. Consequently, both the source base station and the target base station(s) are aware of the new service configuration for SU1 112, and SU1 112 may receive the new voice call while continuing to receive SMS messages.

Figure 4:
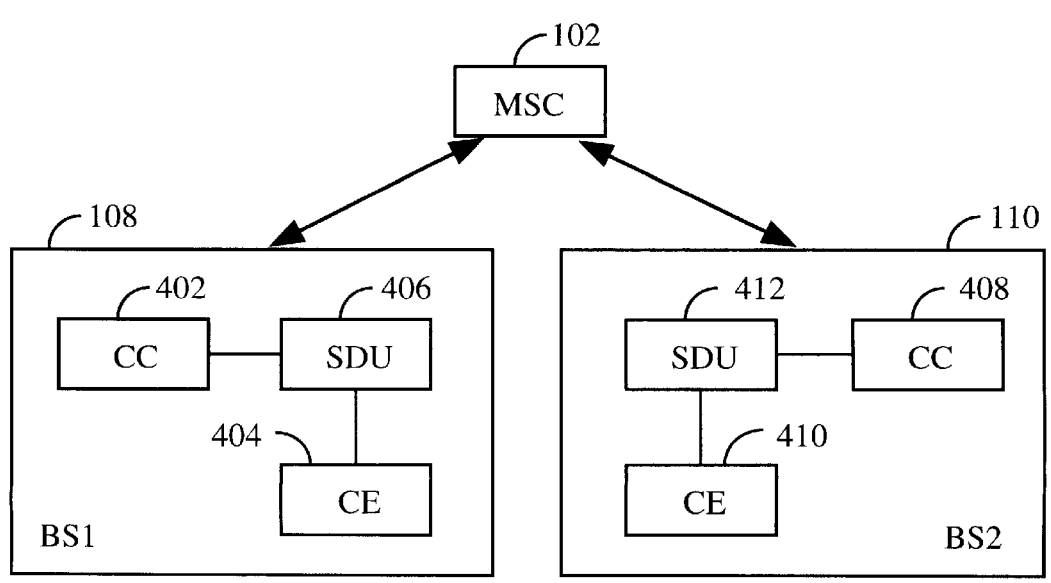
FIG. 4 is a block diagram illustrating the processing elements of base stations utilized for packet mode soft handoff.

Instead of using circuit mode transport, a base station may use packet mode transport for inter base station communication. Using packet mode transport, the base stations may communicate directly with one another. Referring now to FIG. 4, a block diagram is shown illustrating a preferred embodiment of the base station processing elements involved in soft handoff using packet mode transport. In FIG. 4, BS1 108 comprises Call Control (CC) 402, Channel Element (CE) 404, and Selection/Distribution Unit (SDU) 406. Similarly, BS2 110 comprises CC 408, CE 410, and SDU 412. Instead of communicating through MSC 102, SDU 406 of BS1 108 may communicate directly with CE 410 of BS2 110, while CE 404 of BS1 108 may communicate directly with SDU 412 of BS2 110.

CCs 402 and 408 are entities for sending to and receiving from MSC 102 all the IS-634 signaling messages. It is the origination and termination point for all air interface signaling messages. CEs 404 and 408 are entities responsible for providing the air interface between the base stations and the subscriber units. SDUs 406 and 412 are entities which provide the selection/distribution function. The interface between a CE and an SDU is known as the A3 interface, which is composed of a signaling channel and a user traffic channel. The interface between a CC and an SDU is known as the A4 interface, which carries signaling information between the two components.

Figure 5:
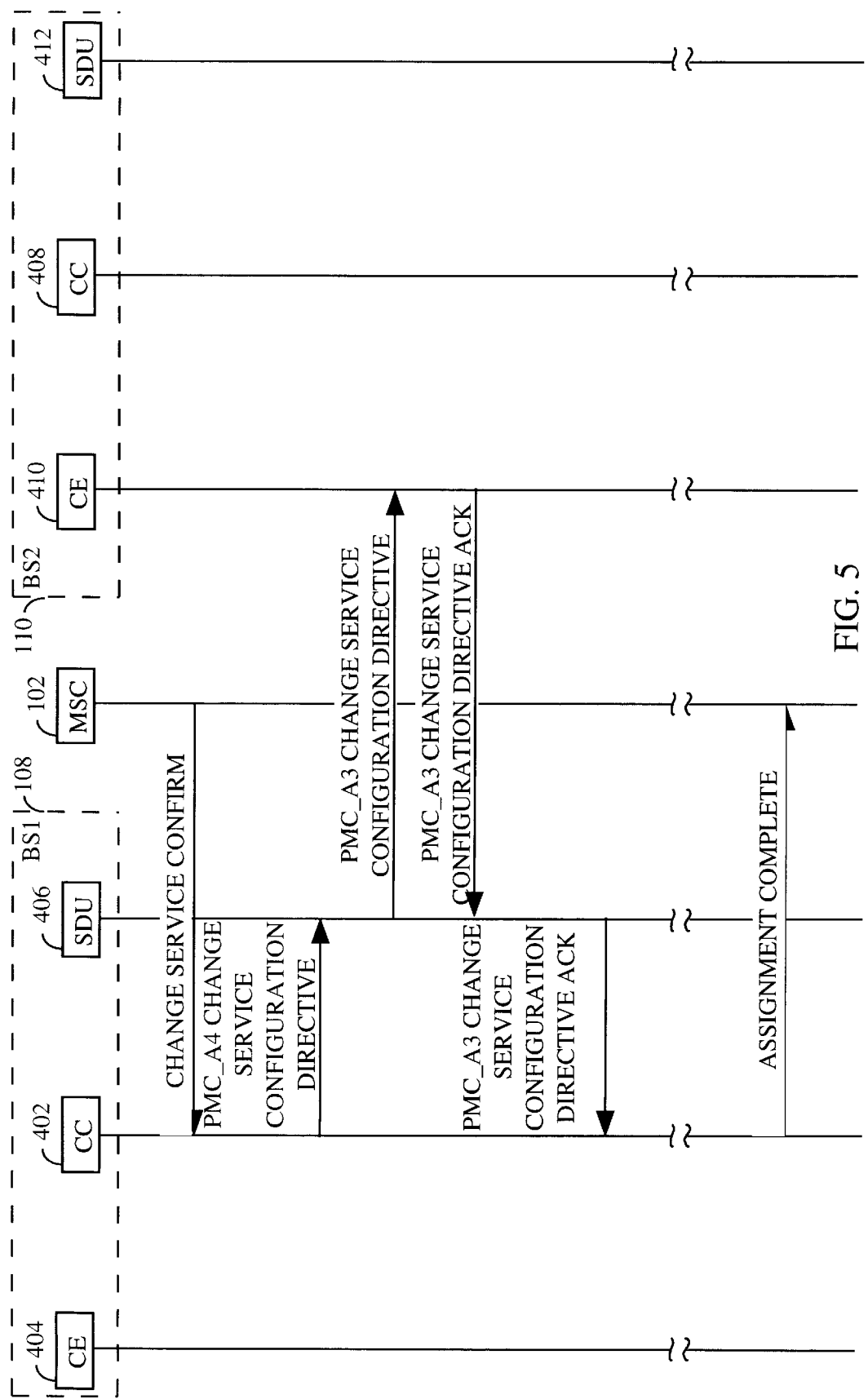
FIG. 5 is a flow diagram illustrating a mobile switching center initiated service negotiation procedure involving base station soft handoff using packet mode transport.

FIG. 5 is a flow diagram illustrating the messages exchanged with the target base stations in soft handoff using packet mode transport following an MSC initiated service negotiation. The messages are shown to be transmitted between the processing elements of FIG. 4. As shown in FIG. 5, BS1 108 is the source base station of the handoff procedure, and BS2 110 is the target base station.

A Change Service Confirm message is transmitted from MSC 102 to CC 402 of BS1 108. As previously described, the Change Service Confirm message contains the new service configuration agreed upon by MSC 102, BS1 108, and the subscriber unit. Because the call is in soft handoff, the target base stations need to be informed of the new service configuration. In FIG. 5, one target base station, BS2 110, is shown, although it should be understood that there may be more than one target base station. Using packet mode transport for inter base station communication, messages used for informing BS2 110 of the new service configuration are transmitted between the processing elements of BS1 108 and BS2 110 without transmission through MSC 102.

In response to the Change Service Confirm message, CC 402 transmits a PMC_A4 Change Service Configuration Directive message to SDU 406 of BS1 108. In turn, SDU 406 transmits a PMC_A3 Change Service Configuration Directive message to CE 410 of BS2 110. The Change Service Configuration Directive message informs BS2 110 of the new service configuration for the call. Having been informed of the new service configuration, CE 410 of BS2 110 sends a PMC_A3 Change Service Configuration Directive Acknowledgment to SDU 406 of BS1 108, and SDU 406 sends a PMC_A4 Change Service Configuration Directive Acknowledgment to CC 402 of BS1 108.

Thereafter, a series of messages are transmitted between the processing elements for the service configuration to become active. Then, an Assignment Complete message is transmitted from CC 402 of BS1 108 to MSC 102, informing MSC 102 that the new service configuration is now active. Upon receipt of the Assignment Complete message, MSC 102 may now facilitate the transmission of both the SMS messages and the voice traffic to the subscriber unit using the new service configuration. Recall that the new service configuration sets the primary service option to be voice, and the secondary service option to be SMS. Alternatively, the new service configuration may provide for SMS messages to be transmitted as signaling messages.

It should be understood that FIGS. 4 and 5 illustrate one of several embodiments available for packet mode transport for inter base station communication. In some systems, the SDU is part of the MSC instead of the BS. Also, the messages transmitted may be differently named, since the messages transmitted within base stations may be left to particular implementations. Additionally, the CC, CE, and SDU components may have different names although they may perform similar functions. Furthermore, the functionality of the CC, CE, and SDU components may be available even though the components themselves may not actually exist. For example, the CC, CE, and SDU components may be collapsed into one unified component which performs the functions of all three. A person skilled in the art will recognize that any of a number of systems may be utilized to allow service configuration information to be transmitted directly between base stations using packet mode transport.

In accordance with the present invention, a system and method is provided for performing MSC initiated service negotiation. The MSC initiated service negotiation may be used to establish a new service configuration allowing for multiple service options in the same call. With the new service configuration, data associated with different types of calls may be transported to and from the same subscriber. In an exemplary embodiment, data associated with a first service option is being transmitted to and from a subscriber unit when a new call of a second service option arrives for the same subscriber unit. Using MSC initiated service negotiation, a new service configuration is established, allowing for the new call to be connected while preserving the existing call. The system and method includes support for service negotiation to take place while in soft handoff. The soft handoff may make use of either circuit mode transport or packet mode transport for inter base station communication.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A telecommunications messaging system, comprising:
a wireless subscriber unit;
a base station in communication with said wireless subscriber unit; and
a mobile switching center for causing said base station to engage in service negotiation with said wireless subscriber unit, said service negotiation for determining a service configuration for communication between said base station and said wireless subscriber units
wherein said mobile switching center comprises:
an MSC message processor for analyzing received messages and for determining messages to be generated and transmitted in association with said service negotiation;
an MSC message generator for generating messages under direction from said message processor, including a first message for causing said base station to engage in said service negotiation with said wireless subscriber unit;
an MSC transceiver for transmitting and receiving messages associated with said service negotiation including transmitting said first message to said base station
wherein said base station comprises:
a BS message processor for analyzing received messages and for determining messages to be generated and transmitted in association with said service negotiation;
a BS message generator for generating messages under direction from said message processor;
a BS transceiver for transmitting and receiving messages associated with said service negotiation;
wherein said wireless subscriber unit comprises:
a SU message processor for analyzing received messages and for determining messages to be generated and transmitted in association with said service negotiation;
a SU message generator for generating messages under direction from said message processor; and
a SU transceiver for transmitting and receiving messages associated with said service negotiation.
a target base station in communication with said subscriber unit
wherein said target base station comprises:
a BS message processor for analyzing received messages and for determining messages to be generated and transmitted in association with said service negotiation;
a BS message generator for generating messages under direction from said message processor; and
a BS transceiver for transmitting and receiving messages associated with said service negotiation.

2. The system of claim 1 wherein said first message is a Change Service Command message.

3. The system of claim 1 wherein said wireless subscriber unit, said base station, and said mobile switching center communicate using code division multiple access (CDMA) modulation techniques.

4. The system of claim 1 wherein said BS message generator of said base station generates a second message containing a negotiated service configuration, and said BS transceiver of said base station transmits said second message.

5. The system of claim 4 wherein said second message is transmitted to said BS transceiver of said target base station via said mobile switching center.

6. The system of claim 4 wherein said second message is transmitted to said BS transceiver of said target base station on a direct interface between said base station and said target base station.

7. The system of claim 1 wherein said MSC message generator generates said first message in response to said mobile switching center determining that a new call is arriving for said wireless subscriber unit when said wireless subscriber unit is already in an existing call.

8. The system of claim 7 wherein said first message proposes a new service configuration which accommodates both said existing call and said new call.

9. The system of claim 8 wherein said existing call is a Short Message Service call.

10. The system of claim 9 wherein said new service configuration provides for said new call to be delivered as a primary service option and for said Short Message Service call to be delivered as a secondary service option.

11. The system of claim 9 wherein said new service configuration provides for said new call to be delivered as a primary service option and for said Short Message Service call to be delivered using signaling messages.

12. In a wireless communication system, a method for establishing a new call when an existing call is in progress, comprising the steps of:

delivering a first message from a mobile switching center to a base station for initiating service negotiation;

negotiating a new service configuration by said base station and a subscriber unit, said new service configuration providing for connection of both said new call and said existing call; and connecting said new call and said existing call using said new service configuration wherein said existing call is a Short Message Service call.

13. The method of claim 12 further comprising the step of informing all target base stations of said new service configuration if said subscriber unit is in soft handoff.

14. The method of claim 12 wherein said wireless system is a code division multiple access (CDMA) system.

15. The system of claim 12 wherein said new service configuration provides for said new call to be delivered as a primary service option and for said Short Message Service call to be delivered as a secondary service option.

16. The system of claim 12 wherein said new service configuration provides for said new call to be delivered as a primary service option and for said Short Message Service call to be delivered using signaling messages.

17. The method of claim 12 wherein said step of delivering delivers a Change Service Command message as said first message.

18. The method of claim 17 wherein said Change Service Command message contains a proposed service configuration which would provide for the connection of both said new call and said existing call.

19. The method of claim 18 wherein said step of negotiating said new service configuration negotiates said new service configuration based on said proposed service configuration.

20. The method of claim 19 wherein said step of negotiating comprises the steps of:

sending a Service Request Message in response to receipt of said Change Service Command message by said base station to said subscriber unit, said Service Request Message proposing a service configuration based on said proposed service configuration;

forwarding a Service Response Message in response to receipt of said Service Request Message by said subscriber unit to said base station, said Service Response Message accepting or modifying said service configuration in said Service Request Message;

repeating said step of sending and said step of forwarding until said subscriber unit and said base station are in concurrence with a negotiated service configuration;

directing a Change Service Request message from said base station to said mobile switching center, said Change Service Request message containing said negotiated service configuration;

repeating the above steps if a Change Service Response message is transmitted by said mobile switching center to said base station, said Change Service Response message indicating that said negotiated service configuration is not acceptable; and establishing said negotiated service configuration as said new service configuration if a Change Service Confirm message is transmitted by said mobile switching center to said base station.

21. The method of claim 20 further comprising the step of informing all target base stations of said new service configuration if said subscriber unit is in soft handoff.

22. The method of claim 21 wherein said step of informing comprises the steps of:

delivering a Change Service Configuration Directive message from said base station to said target base stations, said Change Service Configuration Directive informing said target base stations of said new service configuration; and responding to said Change Service Configuration Directive with Change Service Configuration Directive Ack messages.

23. The method of claim 22 wherein said step of delivering delivers said Change Service Configuration Directive message from said base station to said target base stations via said mobile switching center.

* * * * *